United States Patent
Shimotakahara et al.

(10) Patent No.: US 7,878,712 B2
(45) Date of Patent: Feb. 1, 2011

(54) OPTICAL FIBER, OPTICAL FIBER RIBBON, AND OPTICAL INTERCONNECTION SYSTEM

(75) Inventors: Iwao Shimotakahara, Tokyo (JP); Harumi Inaba, Tokyo (JP); Ryuichi Sugizaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/257,462

(22) Filed: Oct. 24, 2008

(65) Prior Publication Data

US 2009/0052848 A1 Feb. 26, 2009

Related U.S. Application Data

(63) Continuation of application No. PCT/JP2008/054414, filed on Mar. 11, 2008.

(30) Foreign Application Priority Data

Aug. 13, 2007 (JP) .............................. 2007-210944

(51) Int. Cl.
*G02B 6/28* (2006.01)
(52) U.S. Cl. ..................................................... 384/124
(58) Field of Classification Search ............... None
See application file for complete search history.

(56) References Cited

U.S. PATENT DOCUMENTS 6,438,303 B1   8/2002   Abbott, III et al.
2005/0013570 A1   1/2005   Guan et al.
2005/0180709 A1   8/2005   Park et al.
2006/0198589 A1*  9/2006   Sako et al. ................ 385/123
2006/0263019 A1   11/2006  Negishi et al.
2008/0279516 A1*  11/2008  Chen et al. ................ 385/124

FOREIGN PATENT DOCUMENTS

JP    2002-538065    11/2002
JP    2005-37608     2/2005

(Continued)

OTHER PUBLICATIONS

Masuda et al., "High-Density Optical Backplane Using Small Diameter Optcial Fiber", Jul. 1, 2006, vol. 9, No. 4, p. 289-295 (with English Abstract).

(Continued)

*Primary Examiner*—Omar Rojas
(74) *Attorney, Agent, or Firm*—Oblon, Spivak, McClelland, Maier & Neustadt, L.L.P.

(57) ABSTRACT

An optical fiber has a refractive index profile approximated by $n(r)=n1[1-2(\Delta 1/100)(r/a)^\alpha]^{1/2}$ when $0<r \leqq a$, and $n(r)=n1[1-2(\Delta 1/100)]^{1/2}$ when $a<r$, where n1 is refractive index at the center of a core, $\Delta 1$ is relative refractive index difference between the center of the core and a cladding, a is radius of the core, $\alpha$ is refractive index profile parameter, and ^ represents an exponential. $\alpha$ is 1.95 to 2.15. The relative refractive index difference is 1.5% or larger. A diameter of the core is 20 μm to 45 μm. A diameter of the cladding is 70 μm to 90 μm. A bending loss at 850 nm when bending the optical fiber with a curvature radius of 5 mm is 0.1 dB/turn or lower.

8 Claims, 5 Drawing Sheets

FOREIGN PATENT DOCUMENTS

| | | |
|---|---|---|
| JP | 2005-148116 | 6/2005 |
| JP | 2005-227786 | 8/2005 |
| JP | 2006-47719 A | 2/2006 |
| JP | 2006-267584 | 10/2006 |
| JP | 2006-309034 | 11/2006 |
| JP | 2006-317692 | 11/2006 |

OTHER PUBLICATIONS

Saito et al., "High Density Optical Wiring Technologies for Optical Backplane Interconnection", Apr. 15, 2005, vol. 105, No. 27, p. 7-10 (with English Abstract).

Isaji et al., "Multi-Mode Fiber Ribbon Compatible with Standard Ribbon for High-Density Optical Interconnection", Optical and Electronics Laboratory, Fujikara Ltd., Proceedings of the 56$^{th}$ International Wire & Cable Symposium Mar. 7, 2007, p. 501. (in English p. 149-153).

Sakai, Jun-ichi and Kimura, Tatsuya, "Bending loss of propagation modes in arbitrary-index profile optical fibers," Applied Optics, vol. 17, No. 10, May 15, 1978, pp. 1499-1506.

* cited by examiner

| | Δ1 | CORE DIAMETER | CLADDING DIAMETER | α | BENDING LOSS WITH CURVATURE RADIUS OF 5 mm | TRANSMISSION BANDWIDTH |
|---|---|---|---|---|---|---|
| UNIT | % | μm | μm | | dB/TURN | MHz·km |
| EMBODIMENT EXAMPLE 1 | 2.0 | 43.2 | 80.1 | 2.02 | 0.05 | 626 |
| EMBODIMENT EXAMPLE 2 | 2.3 | 40.1 | 80.5 | 2.00 | 0.04 | 597 |
| EMBODIMENT EXAMPLE 3 | 1.8 | 24.6 | 79.5 | 1.99 | 0.03 | 803 |
| EMBODIMENT EXAMPLE 4 | 2.0 | 20.5 | 85.4 | 2.08 | 0.01 | 828 |
| EMBODIMENT EXAMPLE 5 | 2.1 | 30.1 | 79.9 | 2.00 | 0.02 | 760 |
| EMBODIMENT EXAMPLE 6 | 1.5 | 28.5 | 80.0 | 2.05 | 0.05 | 1101 |
| COMPARISON EXAMPLE 1 | 1.0 | 40.0 | 90.2 | 2.06 | 0.68 | 605 |
| COMPARISON EXAMPLE 2 | 1.9 | 39.8 | 60.3 | 1.95 | 0.21 | 621 |
| COMPARISON EXAMPLE 3 | 2.0 | 70.5 | 95.0 | 2.03 | 0.11 | 485 |
| COMPARISON EXAMPLE 4 | 2.0 | 43.3 | 80.0 | 1.80 | 0.05 | 431 |
| COMPARISON EXAMPLE 5 | 2.0 | 43.0 | 80.2 | 2.31 | 0.04 | 452 |

OPTICAL FIBER, OPTICAL FIBER RIBBON, AND OPTICAL INTERCONNECTION SYSTEM

CROSS-REFERENCE TO RELATED APPLICATIONS

This application is a continuation of PCT/JP2008/054414 filed on Mar. 11, 2008, the entire content of which are incorporated herein by reference.

BACKGROUND OF THE INVENTION

1. Field of the Invention

The present invention relates to a multimode optical fiber and an optical fiber ribbon for optical interconnection and an optical interconnection system employing the optical fiber and the optical fiber ribbon.

2. Description of the Related Art

Methods used for transmitting a signal in a device include an electric transmission system and an optical interconnection system. The optical interconnection system is currently attracting attention because it can achieve a signal transmission with an even broader bandwidth that the electric transmission system, a space saving feature, and a low power consumption. There are two systems for implementing the optical interconnection system: one using an optical waveguide circuit; and the other using an optical fiber. However, because it is preferable that all the optical components used in the device should be housed in a space saving manner, the optical fiber occupies a place as one of the optical components suitable for the optical interconnection, with which a flexible wiring can be made and a signal transmission with low loss is possible.

It is often the case that a multimode optical fiber (MMF) is employed as an optical fiber for a short-haul optical transmission. The MMF usually has a core diameter several times to dozens of times larger than a core diameter of a single-mode optical fiber (SMF), with a larger numerical aperture. Therefore, the MMF offers an easy connection with other optical components, and particularly when connecting with an optical component such as a light source, a connection can be made with low loss without performing a highly precise alignment as the case of the SMF.

A graded-index optical fiber (hereinafter, "GI optical fiber"), which is a sort of the MMF, is an MMF in which an influence of the mode dispersion is suppressed by optimizing the refractive index profile of the core region, which is frequently used for a short-haul optical communication.

In particular, there are a larger number of research reports on an optical transmission system in which an LED having an oscillation wavelength of 850 nm or a vertical cavity surface emitting laser (VCSEL) is used as a light source and a GI optical fiber is used as an optical transmission medium.

The GI optical fiber used in a typical short-haul optical communication is the GI optical fiber having the core diameter of 50 μm and the maximum relative refractive index difference of 1.0% defined in the ITU-T (International Telecommunication Union Telecommunication Standardization Sector) G.651. However, it is difficult to use this GI optical fiber as an optical fiber for the optical interconnection system because it produces a large bending loss when bending the optical fiber for housing it in a device.

In the meanwhile, a method of reducing the bending loss is disclosed in Japanese Patent Application Laid-open No. 2006-47719, with an MMF having an α-powered refractive index profile in which a depressed region having a refractive index lower than that of the cladding is formed on the outside of the core.

However, providing the α-powered refractive index profile to the core and forming the depressed region in the cladding in the optical fiber make the refractive index profile complicated, causing troublesomeness in its fabrication. In addition, because it is required to use a dopant for lowering the refractive index, such as fluorine, there is a problem of increasing the manufacturing cost.

SUMMARY OF THE INVENTION

It is an object of the present invention to at least partially solve the problems in the conventional technology.

According to one aspect of the present invention, there is provided an optical fiber including a core and a cladding that is formed around the core. A refractive index profile n(r) in a radial direction of the optical fiber is approximated by $n(r)=n1[1-2(\Delta 1/100)(r/a)^\alpha]^{1/2}$, when $0<r\leq a$, and $n(r)=n1[1-2(\Delta 1/100)]^{1/2}$, when $a<r$, where n1 is refractive index at a center of the core, $\Delta 1$ is relative refractive index difference between the center of the core and the cladding, a is radius of the core, α is refractive index profile parameter, and "^" is a symbol representing an exponential. The value of α is 1.95 to 2.15. The relative refractive index difference is equal to or larger than 1.5%. A diameter of the core is 20 μm to 45 μm. A diameter of the cladding is 70 μm to 90 μm. A bending loss at the wavelength of 850 nm when bending the optical fiber with a curvature radius of 5 mm is equal to or lower than 0.1 dB/turn.

Furthermore, according to another aspect of the present invention, there is provided an optical fiber ribbon including a plurality of optical fibers each including a core and a cladding that is formed around the core. A refractive index profile n(r) in a radial direction of each of the optical fibers is approximated by $n(r)=n1[1-2(\Delta 1/100)(r/a)^\alpha]^{1/2}$, when $0<r\leq a$, and $n(r)=n1[1-2(\Delta 1/100)]^{1/2}$, when $a<r$, where n1 is refractive index at a center of the core, $\Delta 1$ is relative refractive index difference between the center of the core and the cladding, a is radius of the core, α is refractive index profile parameter, and "^" is a symbol representing an exponential. The value of α is 1.95 to 2.15. The relative refractive index difference is equal to or larger than 1.5%. A diameter of the core is 20 μm to 45 μm. A diameter of the cladding is 70 μm to 90 μm. A bending loss at the wavelength of 850 nm when bending the optical fiber with a curvature radius of 5 mm is equal to or lower than 0.1 dB/turn. The optical fibers are integrated in a flat band shape by being arranged in parallel.

Moreover, according to still another aspect of the present invention, there is provided an optical interconnection system including a vertical cavity surface emitting laser that outputs an optical signal in a wavelength band of 0.85 μm and an optical fiber ribbon connected to the vertical cavity surface emitting laser. The optical fiber ribbon includes a plurality of optical fibers each including a core and a cladding that is formed around the core. A refractive index profile n(r) in a radial direction of each of the optical fibers is approximated by $n(r)=n1[1-2(\Delta 1/100)(r/a)^\alpha]^{1/2}$, when $0<r\leq a$, and $n(r)=n1[1-2(\Delta 1/100)]^{1/2}$, when $a<r$, where n1 is refractive index at a center of the core, $\Delta 1$ is relative refractive index difference between the center of the core and the cladding, a is radius of the core, α is refractive index profile parameter, and "^" is a symbol representing an exponential. The value of α is 1.95 to 2.15. The relative refractive index difference is equal to or larger than 1.5%. A diameter of the core is 20 μm to 45 μm. A diameter of the cladding is 70 μm to 90 μm. A bending loss at the wavelength of 850 nm when bending the optical fiber with a curvature radius of 5 mm is equal to or lower than 0.1 dB/turn. The optical fibers are integrated in a flat band shape by being arranged in parallel.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical fiber, an optical fiber ribbon, and an optical interconnection system according to the present invention will be explained in detail below with reference to the accompanying drawings. It should be mentioned that the present invention is not to be considered limited to the embodiments. In this specification, a transmission bandwidth means the transmission bandwidth defined in the ITU-T G. 651. Other terminologies not specifically defined in the specification comply with the definitions and the measurement methods in the ITU-T G. 651. In addition, in this specification, a term "turn" is used to count curved portions, which are portions of the optical fiber at which a bending is formed. When there is a portion at which the optical fiber is bent 360 degrees, this portion is counted as 1 turn. When there are four portions at which the optical fiber is bent 90 degrees, for example, a sum of the portion is counted as 1 turn, and when there are two portions at which the optical fiber is bent 90 degrees, it is counted as ½ turn.

Figure 1:
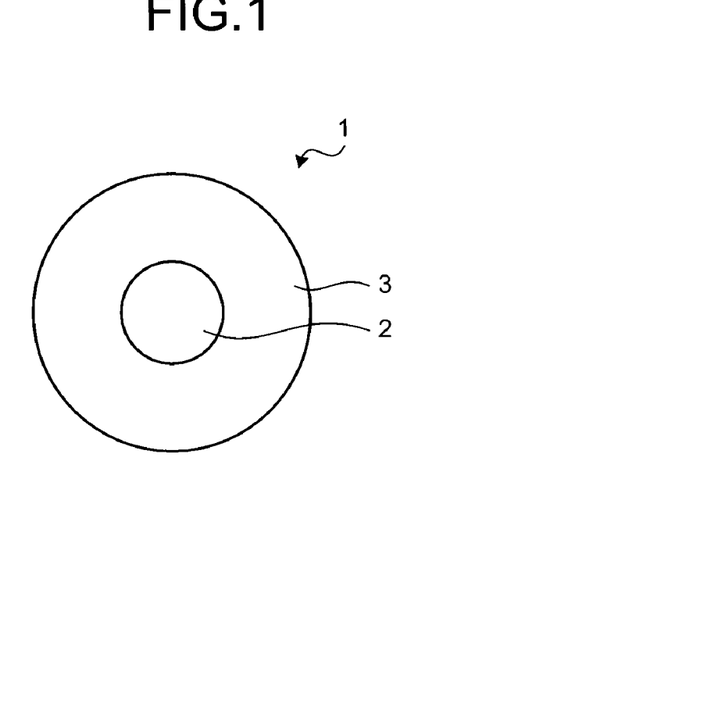
FIG. 1 is a schematic cross section of an optical fiber according to a first embodiment of the present invention.
Figure 2:
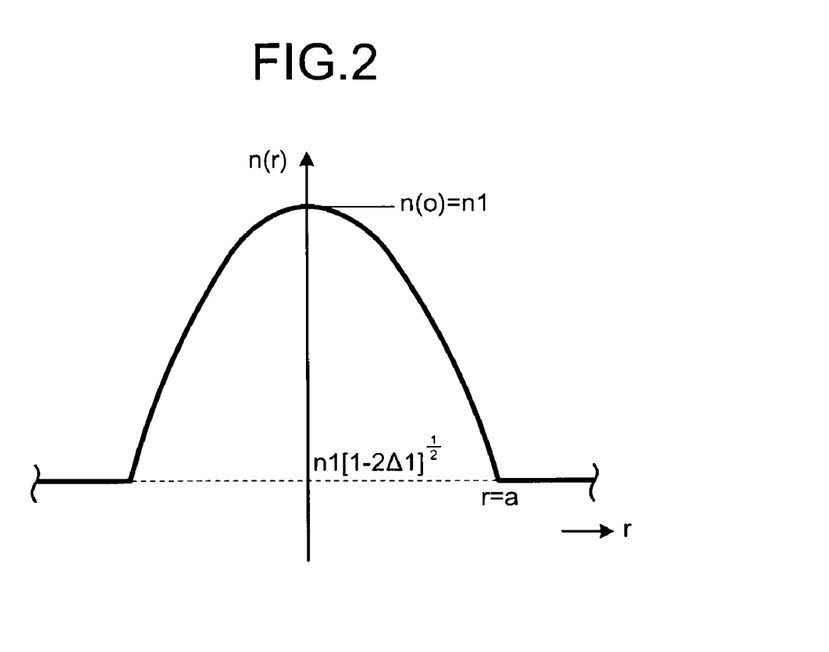
FIG. 2 is a schematic diagram of a radial-direction refractive index profile of the optical fiber shown in FIG. 1.

FIG. 1 is a schematic cross section of an optical fiber 1 according to a first embodiment of the present invention. As shown in FIG. 1, the optical fiber 1 a multimode optical fiber made of silica-based glass, including a core 2 and a cladding 3 formed on the outer circumference of the core 2. The optical fiber 1 further includes a coating made of ultraviolet-curing resin or thermoplastic resin on the outer circumference of the cladding 3, which is not shown in the figure. FIG. 2 is a schematic diagram of a radial-direction refractive index profile of the optical fiber 1 shown in FIG. 1. As shown in FIG. 2, the optical fiber 1 has a radial-direction refractive index profile $n(r)$, which is approximated by $n(r)=n1[1-2(\Delta 1/100)(r/a)^\alpha]^{1/2}$, when $0<r\leq a$, and $n(r)=n1[1-2(\Delta 1/100)]^{1/2}$, when $a<r$, where n1 is refractive index at the center of the core 2, $\Delta 1$ is relative refractive index difference between the center of the core 2 and the cladding, a is radius of the core 2, $\alpha$ is refractive index profile parameter, and "^" is a symbol representing an exponential. In other words, the core 2 has a so-called $\alpha$-powered refractive index profile. The refractive index profile of the optical fiber 1 is realized by forming the core 2 with $GeO_2$-doped silica glass and the cladding 3 with pure silica glass that does not contain any dopant for adjusting the refractive index.

$\Delta 1$ is defined by Equation (1), where nc is the minimum refractive index of the cladding 3.

$$\Delta 1=[(n1^2-nc^2)/2n1^2]\times 100[\%] \quad (1)$$

In addition, a core diameter $2a$, which is the diameter of the core 2, is defined as matching with the outer diameter at a position where the relative refractive index difference based on the cladding 3 corresponds to 5% (1/20) of $\Delta 1$.

In the optical fiber 1, $\alpha$ is 1.95 to 2.15, the relative refractive index difference $\Delta 1$ is equal to or larger than 1.5%, the core diameter of the core 2 is 20 µm to 45 µm, the cladding diameter, which is the diameter of the cladding 3, is 70 µm to 90 µm. With these parameters, the optical fiber 1 is optimized such that the transmission bandwidth is maximized at a wavelength of 850 nm, and despite that the refractive index profile is a simple $\alpha$-powered refractive index profile, the bending loss at the wavelength of 850 nm when bending the optical fiber with a curvature radius of 5 mm is equal to or lower than 0.1 dB/turn. Therefore, it offers a low failure probability when a bending is applied and a good coupling efficiency with a light source such as a VCSEL.

In the optical interconnection, when considering an actual wiring pattern of the optical fiber in a device, a wired optical fiber is considered to have a bending with a curvature radius of about 5 mm at a plurality of portions. In addition, a local bending may be added to the optical fiber at the time of installing the wiring. Taking the above-described wiring pattern and the like of the optical fiber into consideration, a magnitude of the bending loss that is allowed for the optical fiber in the entire optical interconnection will be discussed. Based on a standpoint of loss fluctuation, it is preferable that the loss of the optical fiber in a device should be equal to or lower than 0.5 dB. In addition, taking a vibration due to a cooling fan and the like in the device, as long as the bending loss occurred when a turn of bending with the curvature radius of 5 mm is applied to the optical fiber is equal to or lower than 0.1 dB, it would appear that the optical fiber has a sufficiently good bending loss characteristic and can make a flexible optical wiring. Hereinafter, when a description is simply a bending loss, it means a bending loss at the wavelength of 850 nm when the optical fiber is bent with a curvature radius of 5 mm.

Figure 3:
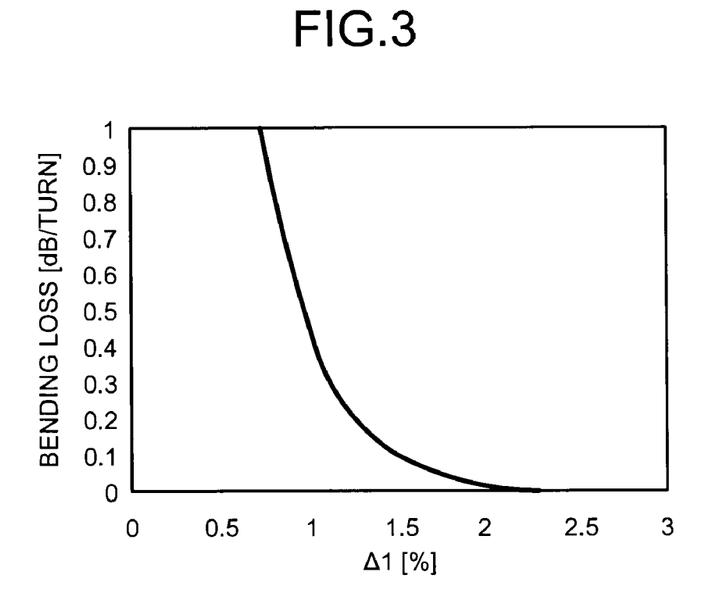
FIG. 3 is a graph showing a change of the bending loss in an optical fiber having a structure similar to that of the optical fiber shown in FIG. 1 with a change of the relative refractive index difference $\Delta 1$.

A more specific explanation on the optical fiber 1 according to the first embodiment will be given below using a calculation result. FIG. 3 is a graph showing a change of the bending loss in an optical fiber having a structure similar to that of the optical fiber 1 with a change of the relative refractive index difference Δ1. In FIG. 3, the calculation is performed with the core diameter of 30 μm, the refractive index profile parameter α of 2.0, and the cladding diameter of 80 μm. As shown in FIG. 3, as Δ1 increases, that is, as the effective refractive index of the core increases, the confinement effect of the propagation mode within the core increases, and as a result, the bending loss decreases.

On the other hand, if Δ1 increases, the doping amount of $GeO_2$ increases, which is a dopant for increasing the refractive index, the transmission loss increases due to the Rayleigh scattering of $GeO_2$, and the manufacturing cost increases. However, in the optical fiber 1 according to the first embodiment, the bending loss shows a good value of 0.1 dB/turn because Δ1 is equal to or larger than 1.5%. Furthermore, if Δ1 is equal to or smaller than 2.5%, increases of the transmission loss and the cost are suppressed, which is more preferable.

Figure 4:
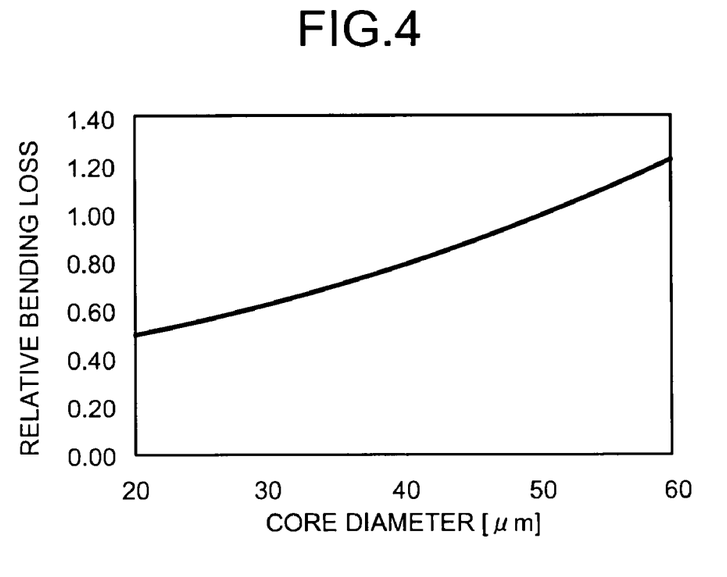
FIG. 4 is a graph showing a change of a relative bending loss in an optical fiber having a structure similar to that of the optical fiber shown in FIG. 1 with a change of the core diameter.

FIG. 4 is a graph showing a change of a relative bending loss in an optical fiber having a structure similar to that of the optical fiber 1 with a change of the core diameter. The relative bending loss means a relative value of bending loss when the bending loss with the core diameter of 50 μm is set to 1 as a standard GI optical fiber. For example, the relative bending loss in the case of the core diameter of 40 μm is a value obtained by dividing a bending loss in the case of the core diameter of 40 μm by a bending loss in the case of the core diameter of 50 μm. In FIG. 4, the calculation is performed with the refractive index profile parameter α of 2.0 and the relative refractive index difference Δ1 of 2.0%, considering the cladding diameter as a value with which the light can be sufficiently confined. As shown in FIG. 4, as the core diameter decreases, the relative bending loss decreases. Because the optical fiber 1 according to the first embodiment has the core diameter of 20 μm to 45 μm, the relative bending loss is about 0.5 to 0.9, which shows a low bending loss by 10% to 50% compared to the case of the core diameter of 50 μm.

Figure 5:
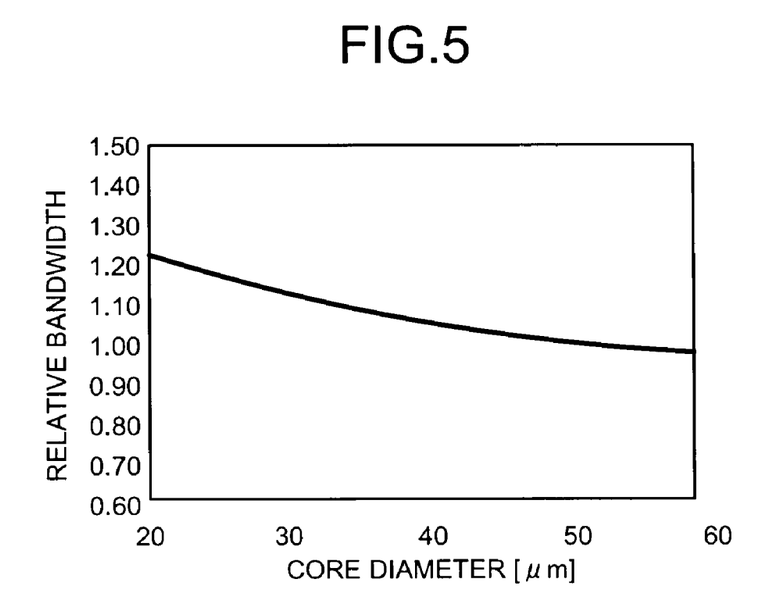
FIG. 5 is a graph showing a change of the relative bandwidth in an optical fiber having a structure similar to that of the optical fiber shown in FIG. 1 with a change of the core diameter.

FIG. 5 is a graph showing a change of the relative bandwidth in an optical fiber having a structure similar to that of the optical fiber 1 with a change of the core diameter. The relative bandwidth means a relative value of transmission bandwidth when the transmission bandwidth at the wavelength of 850 nm with the core diameter of 50 μm is set to 1. For example, the relative bandwidth in the case of the core diameter of 40 μm is a value obtained by dividing a transmission bandwidth in the case of the core diameter of 40 μm by a transmission bandwidth in the case of the core diameter of 50 μm. In FIG. 5, the calculation is performed with the refractive index profile parameter α of 2.0 and the relative refractive index difference Δ1 of 2.0%, considering the cladding diameter as a value with which the light can be sufficiently confined. As shown in FIG. 5, as the core diameter decreases, the relative bandwidth increases. The reason is considered that, if the core diameter decreases, the number of higher-order modes to be propagated is limited and it becomes difficult for a decrease of the effective transmission bandwidth due to a mode conversion to be generated. On the other hand, as the core diameter decreases, a coupling efficiency with a light source, such as a VCSEL and the like, is degraded. However, in the optical fiber 1 according to the first embodiment, the relative bandwidth is equal to or larger than 1.03 because the core diameter is 20 μm to 45 μm, which shows a broader transmission bandwidth by equal to or larger than about 3% compared to the case of the core diameter of 50 μm, without showing a decrease of the coupling efficiency with the light source. Furthermore, as long as the core diameter is equal to or smaller than 30 μm, the relative bandwidth becomes equal to or larger than 1.1, which is more preferable. As described above, because the optical fiber 1 according to the first embodiment has the core diameter of 20 μm to 45 μm, the bending loss is well reduced in a range in which the coupling efficiency does not decrease, and at the same time, the transmission bandwidth is broadened.

Figure 6:
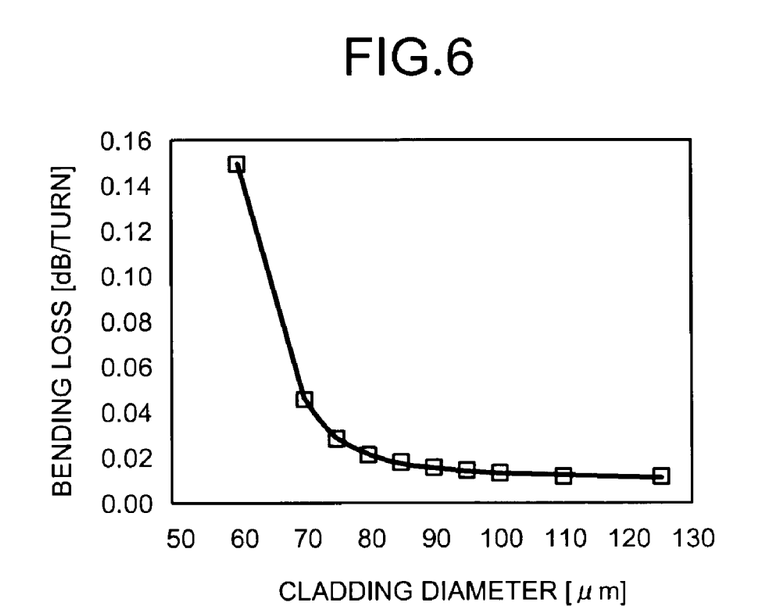
FIG. 6 is a graph showing a change of the bending loss in an optical fiber having a structure similar to that of the optical fiber shown in FIG. 1 with a change of the cladding diameter.

FIG. 6 is a graph showing a change of the bending loss in an optical fiber having a structure similar to that of the optical fiber 1 with a change of the cladding diameter. In FIG. 6, the calculation is performed with the refractive index profile parameter α of 2.0, the relative refractive index difference Δ1 of 2.0%, and the core diameter of 30 μm. As shown in FIG. 6, as the cladding diameter decreases smaller than 70 μm, the bending loss sharply increases. However, because the optical fiber 1 according to the first embodiment has the cladding diameter of 70 μm to 90 μm, the bending loss is low enough. The reason which the bending loss sharply increases as the cladding diameter decreases is that, if a thickness of the cladding is thin, an influence of a side pressure caused by a bending on the core region increases, which means that an influence of an external disturbance due to the bending increases. As a result, a number of lights of higher-order modes with low effective refractive indexes cannot be sufficiently confined, and therefore, they are radiated at the bending portion.

In an optical fiber, as the cladding diameter increases and as the bending radius decreases, a large distortion is generated when the optical fiber is bent, with an increased failure probability. For example, when building an optical interconnection system using a silica-based optical fiber, there is a case in which a bending with the curvature radius of 5 mm and the angle of 90 degrees is applied at about 20 portions of the optical fiber. In this case, if the screening level is 2%, the fatigue parameter that is determined by a coating material is 22, and a life cycle of the product is 5 years, the failure rate in the case where the cladding diameter of the optical fiber is 125 μm is 5.5%. However, from a standpoint of the system design, it is preferable that the failure rate should be equal to or smaller than 0.05%.

On the other hand, because the cladding diameter of the optical fiber 1 according to the first embodiment is as small as 70 μm to 90 μm, the failure rate is reduced. For example, in the case where the cladding diameter is 90 μm, the failure rate of the optical fiber 1 is 0.04%, which is a value about 0.7% of the failure rate of the optical fiber having the cladding diameter of 125 μm. As described above, because the optical fiber employed in the optical interconnection system is bent with a small bending diameter, an effect from a reduction of the failure rate is significant. Furthermore, because a volume of the optical fiber can be reduced by reducing the cladding diameter, it is also preferable from a standpoint of space-saving packaging.

In addition, the optical fiber 1 according to the first embodiment can be easily manufactured with a low cost using a standard method. For example, a method of depositing a silica glass soot when fabricating an optical fiber preform is not particularly limited, but a particle molding method and a sol-gel method can be used as well as a vapor-phase reaction method such as a VAD (Vapor-phase Axial Deposition) method, an OVD (Outside Vapor Deposition) method, and an MCVD (Modified Chemical Vapor Deposition) method. Furthermore, although there is a case where the refractive index profile of the optical fiber 1 becomes a state in which a skirt shape, i.e., a tapered portion is formed at the boundary between the core 2 and the cladding 3 in fabricating, as long as it can be approximated as the α-powered refractive index profile, the effect of the present invention can be obtained.

Figure 7:
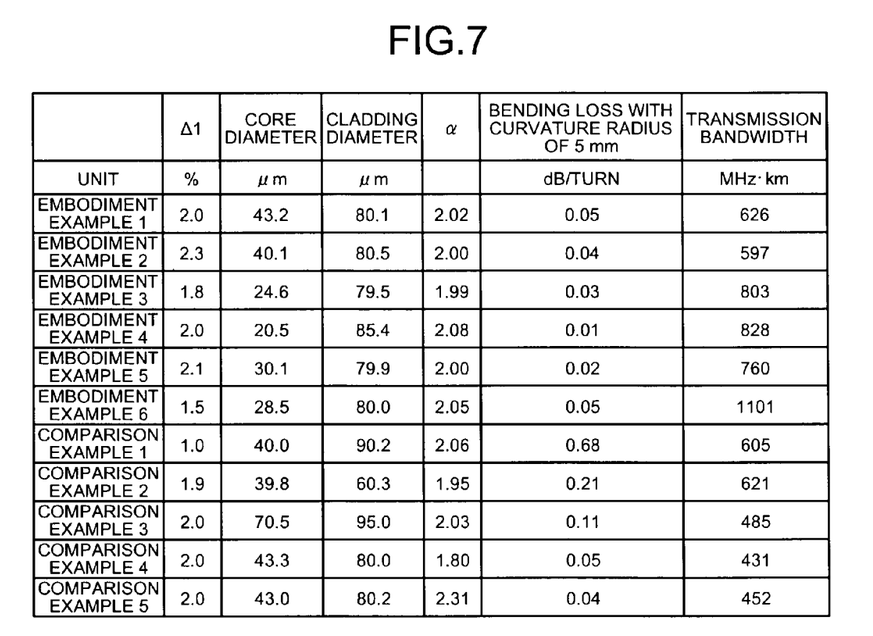
FIG. 7 is a table of design parameters and optical characteristics of optical fibers according to embodiment examples 1 to 6 and comparison examples 1 to 5 of the present invention.

Embodiment examples of the present invention will be explained below, however, the present invention is not to be considered limited to the following embodiment examples. FIG. 7 is a table of design parameters and optical characteristics of optical fibers according to embodiment examples 1 to 6 and comparison examples 1 to 5 of the present invention. In FIG. 7, the optical characteristics show values at the wavelength of 850 nm.

Each of the embodiment examples and the comparison examples will be explained below. As the embodiment example 1 of the present invention, an optical fiber having the same structure as that of the optical fiber 1 according to the first embodiment is manufactured with the design parameters: Δ1 of 2.0%, the core diameter of 43.2 μm, the cladding diameter of 80.1 μm, and α of 2.02. The optical fiber according to the embodiment example 1 has good optical characteristics, such as the bending loss of 0.05 dB/turn and the transmission bandwidth of 626 MHz·km.

In addition, a fabrication of an optical fiber having the design parameters shown in FIG. 7, as the embodiment example 2, shows good optical characteristics, such as the bending loss of 0.04 dB/turn and the transmission bandwidth of 597 MHz·km.

Furthermore, a fabrication of optical fibers having the core diameter of about 20 μm to 30 μm, which is smaller than those of the optical fibers according to the embodiment examples 1 and 2, as shown in FIG. 7, as the embodiment examples 3 to 6, shows good optical characteristics, such as the bending loss of 0.03 dB/turn, 0.01 dB/turn, 0.02 dB/turn, and 0.05 dB/turn, respectively, and the transmission bandwidth of 803 MHz·km, 828 MHz·km, 760 MHz·km, and 1101 MHz·km, respectively. In other words, the optical fibers according to the embodiment examples 3 to 6 realize a broader transmission bandwidth while maintaining a low bending loss by taking the core diameter smaller than those of the optical fibers according to the embodiment examples 1 and 2. A coupling of the optical fibers according to the embodiment examples 3 to 6 with a VCSEL does not show a degradation of the coupling efficiency compared to cases where the optical fibers according to the embodiment examples 1 and 2 are used.

On the other hand, a fabrication of an optical fiber having a small relative refractive index difference Δ1 of 1.0% as shown in FIG. 7, as the comparison example 1, shows a large bending loss of 0.68 dB/turn.

Furthermore, a fabrication of an optical fiber having a small cladding diameter of 60.3 μm as shown in FIG. 7, as the comparison example 2, shows a large bending loss of 0.21 dB/turn.

Moreover, a fabrication of an optical fiber having a large core diameter of 70.5 μm as shown in FIG. 7, as the comparison example 3, shows a relatively large bending loss of 0.11 dB/turn with a relatively narrower transmission bandwidth of 485 MHz·km.

Furthermore, a fabrication of an optical fiber having α of 1.80, which is smaller than those of the optical fibers according to the embodiment examples 1 and 2, as shown in FIG. 7, as the comparison example 4, shows a relatively narrower transmission bandwidth of 431 MHz·km. In other words, because a is smaller than 1.95, the transmission bandwidth becomes narrow.

Moreover, a fabrication of an optical fiber having α of 2.31, which is larger than those of the optical fibers according to the embodiment examples 1 and 2, as shown in FIG. 7, as the comparison example 5, shows a relatively narrower transmission bandwidth of 452 MHz·km. In other words, because α is larger than 2.15, the transmission bandwidth becomes narrow.

Figure 8:
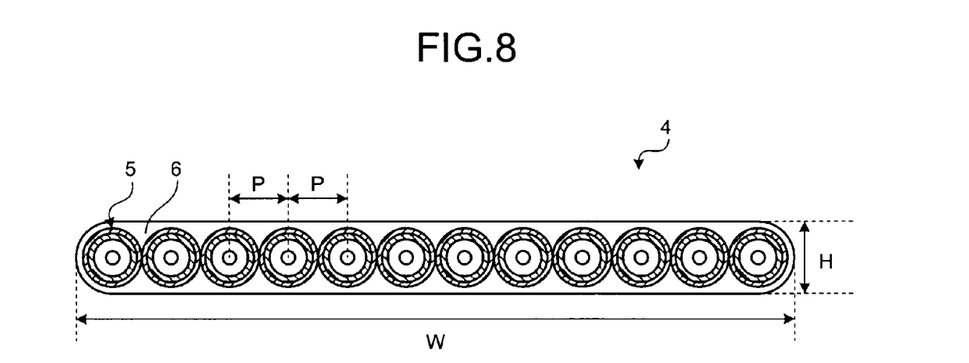
FIG. 8 is a schematic cross section of an optical fiber ribbon according to a second embodiment of the present invention.

An optical fiber ribbon according to a second embodiment of the present invention will be explained below. FIG. 8 is a schematic cross section of an optical fiber ribbon 4 according to a second embodiment of the present invention. As shown in FIG. 8, the optical fiber ribbon 4 includes 12 lines of optical fibers 5 arranged in parallel, which are integrated in a flat band shape by a ribbon coating 6 that is made of ultraviolet-curing resin.

Figure 9:
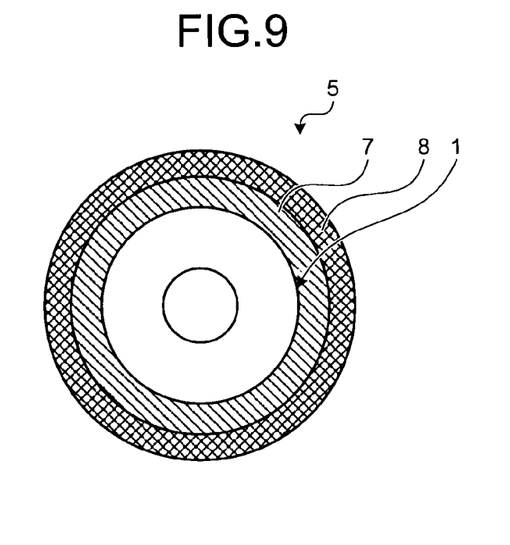
FIG. 9 is a schematic cross section of an optical fiber shown in FIG. 8.

FIG. 9 is a schematic cross section of the optical fiber 5 shown in FIG. 8. As shown in FIG. 9, the optical fiber 5 includes a primary resin coating 7 and a secondary resin coating 8 sequentially formed on the outer circumference of the cladding of the optical fiber 1 according to the first embodiment. The cladding diameter of the optical fiber 1, i.e., the outer diameter, is 80 μm, and the outer diameters of the primary resin coating 7 and the secondary resin coating 8 are 105 μm and 125 μm, respectively. In other words, the optical fiber 5 is compact-sized because the cladding diameter is small and the thickness of the coating is thin compared to a standard silica-based optical fiber having the cladding diameter of 125 μm and the outer diameter of the coating of 250 μm. As a result, the optical fiber ribbon 4 shown in FIG. 8 is also compact-sized. In the optical fiber ribbon 4, a pitch P between the center axes of the optical fibers 5 is 125 μm and a width W is 1.55 mm, which is a half size of a standard optical fiber ribbon. Therefore, it offers an extremely high flexibility, and it can be accommodated in a device in a space-saving manner. In addition, the thickness of the ribbon coating 6 is set such that a thickness H of the optical fiber ribbon 4 becomes 170 μm, and therefore, it can prevent an increase of the loss due to a fact that the primary resin coating 7 and the secondary resin coating 8 are thin, realizing a space-saving feature.

As materials for at least one of the primary resin coating 7 and the secondary resin coating 8 and the ribbon coating, it is preferable to use flame-retardant ultraviolet-curing resin. For example, it is possible to use flame-retardant ultraviolet-curing urethane acrylate resin as the flame-retardant ultraviolet-curing resin. The flame-retardant ultraviolet-curing urethane acrylate resin can be manufactured, for example, as follows. The ultraviolet-curing resin is made flame retardant by adding a halogen additive agent such as bromine and chlorine, an antimony compound such as antimony trioxide and triphenyl antimony, a metal hydrate such as aluminum hydroxide and magnesium hydroxide, or a phosphor compound such as phosphoric ester. Alternatively, the ultraviolet-curing resin is made flame retardant by halogenating prepolymer or acryl monomer constituting the ultraviolet-curing resin with bromine or chlorine and adding phosphorus to the halogenated prepolymer or acryl monomer. Among these methods, the method of adding a bromine additive agent is particularly effective making the ultraviolet-curing resin flame retardant.

The reason why the ultraviolet-curing resin is made flame retardant by changing a composition as described above is considered to be because a product from a decomposition reaction covers the surface of the resin or a decomposition gas generated from inflammation forms a shield layer between the resin and the air. In addition, it can be considered that a radical from the halogen compound blocks a continuation of inflammation, and furthermore, the resin is three-dimensionalized by a cross linking.

As an embodiment example 7 of the present invention, an optical fiber having the same structure as that of the optical fiber shown in FIG. 9 is fabricated using the ultraviolet-curing urethane acrylate resin containing the aluminum hydroxide as a flame retardant for the primary and the secondary resin coatings, and this optical fiber is evaluated by JIS C3005 60-degree tilt flame test. The result of the test shows that a flame lighted on the optical fiber is naturally extinguished in about 3.2 seconds on average, which satisfies the standards.

Although the flame-retardant ultraviolet-curing urethane acrylate resin is used for the primary and the secondary resin coatings in the embodiment example 7, flame-retardant thermoplastic resin can also be used instead of the flame-retardant ultraviolet-curing urethane acrylate resin.

As an embodiment example 8 of the present invention, a optical fiber ribbon having the same structure as the optical fiber ribbon according to the second embodiment is fabricated using the ultraviolet-curing urethane acrylate resin containing a flame retardant for the second resin coating of the optical fiber and the ribbon coating, and this optical fiber ribbon is evaluated by JIS C3005 60-degree tilt flame test. The result of the test shows that a flame lighted on the optical fiber ribbon is naturally extinguished in about 2.6 seconds on average, which satisfies the standards. Furthermore, a result of performing UL 1581 vertical flame test on this optical fiber ribbon shows that a flame is naturally extinguished in about 5.7 seconds on average. In addition the UL standards can be satisfied with no droppings on flaming. When performing the vertical flame test on the optical fiber before forming the optical fiber ribbon, a flame is naturally extinguished in about 7.6 seconds on average. From the results of the tests, in the optical fiber ribbon according to the embodiment example 8, it is confirmed that both of the optical fiber and the optical fiber ribbon have a sufficient flame resistance.

Although the flame-retardant ultraviolet-curing resin is used for the ribbon coating in the embodiment example 8, flame-retardant thermoplastic resin can also be used instead of the flame-retardant ultraviolet-curing resin.

Figure 10:
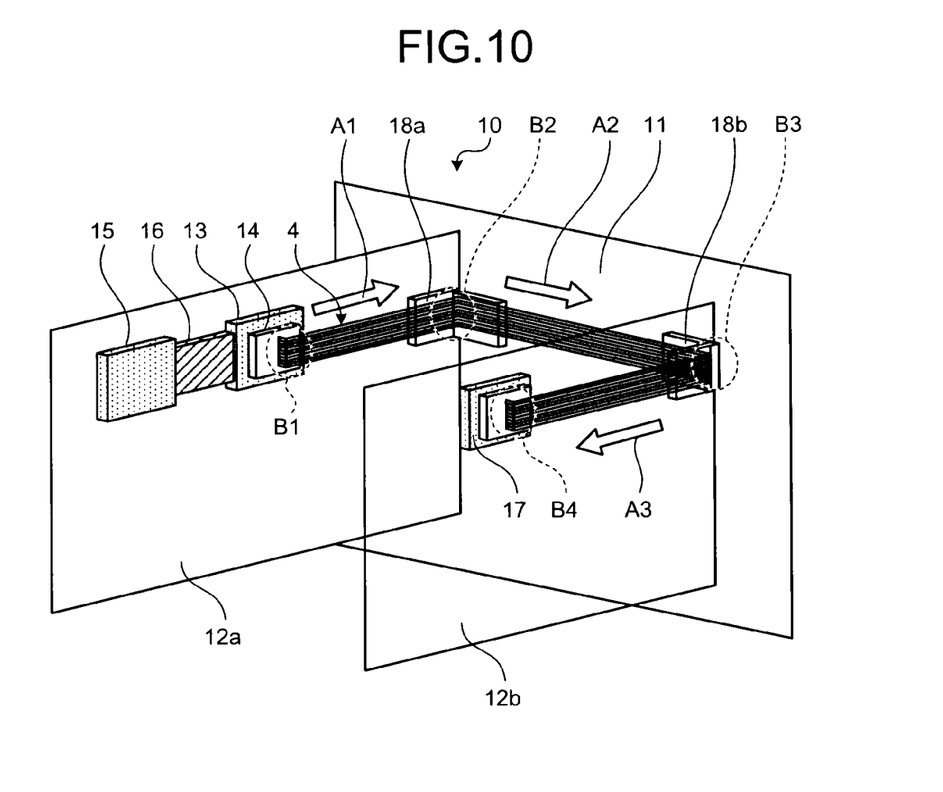
FIG. 10 is a schematic perspective view of an optical interconnection system according to a third embodiment of the present invention.

An optical interconnection system according to a third embodiment of the present invention will be explained below. FIG. 10 is a schematic perspective view of an optical interconnection system 10 according to a third embodiment of the present invention. As shown in FIG. 10, in the optical interconnection system 10, sides of two print boards 12a and 12b are supported on a surface of a backplane 11, facing each other at a predetermined distance. On an opposed surface of the print board 12a, a VCSEL 14, which is mounted on a driver IC 13, and an LSI 15 are mounted. The LSI 15 and the VCSEL 14 are electrically connected to each other with an electric wire 16. On an opposed surface of the print board 12b, a PD 17, which is a photodetecting element, is mounted. The VCSEL 14 and the PD 17 are collectively connected to each other with the optical fiber ribbon 4 according to the second embodiment.

The optical fiber ribbon 4 is first extended along the main surface of the print board 12a, is bent at a substantially right angle via a first connector 18a, runs on the backplane 11, is bent at a substantially right angle via a second connector 18b, is extended along the main surface of the print board 12b, and then reaches the PD 17. The VCSEL 14 outputs an optical signal that is directly modulated, the optical fiber ribbon 4 transmits the optical signal in directions indicated by arrows A1 to A3, and the PD 17 receives the optical signal transmitted through the optical fiber ribbon 4.

By routing the optical fiber ribbon 4 in this manner, bending portions B1 to B4 with a curvature radius of about 5 mm are applied at four portions of the optical fiber ribbon 4 by ¼ turn for each of the portions. However, because the optical fiber ribbon 4 has a low bending loss, a broad transmission bandwidth, and a good coupling efficiency with the VCSEL 14, the optical interconnection system 10 with a capability of performing a high-speed optical transmission can be preferably realized. In addition, because the optical fiber ribbon 4 has an extremely low failure probability against bending, there will be virtually no failure even after 5 years of usage, which is the life cycle of the product. Furthermore, the optical fiber ribbon 4 has an extremely high flexibility and can be accommodated in a device in a space-saving manner, the optical interconnection system 10 will also have the space-saving feature.

According to one aspect of the present invention, there is an effect of realizing an optical fiber and an optical fiber ribbon that have a capability of achieving a high-speed optical transmission and a low bending loss and that can be easily fabricated with a low cost.

Furthermore, according to another aspect of the present invention, there is an effect of realizing an optical interconnection system having a capability of achieving a high-speed optical transmission with a space-saving feature and a low cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multimode optical fiber comprising:
    a core; and
    a cladding that is formed around the core, wherein
    a refractive index profile n(r) in a radial direction is approximated by
    $n(r)=n1[1-2(\Delta1/100)(r/a)^\alpha]^{1/2}$, when $0<r\leq a$, and
    $n(r)=n1[1-2(\Delta1/100)]^{1/2}$, when $a<r$,
    where n1 is refractive index at a center of the core, Δ1 is relative refractive index difference between the center of the core and the cladding, a is radius of the core, α is refractive index profile parameter, and "^" is a symbol representing an exponential,
    α is 1.95 to 2.15,
    the relative refractive index difference is equal to or larger than 1.5%,
    a diameter of the core is 20 micrometers to 45 micrometers,
    a diameter of the cladding is 70 micrometers to 90 micrometers, and
    a bending loss at a wavelength of 850 nanometers when bending the optical fiber with a curvature radius of 5 millimeters is equal to or lower than 0.1 dB/turn.

2. The multimode optical fiber according to claim 1, wherein the diameter of the core is equal to or smaller than 30 micrometers.

3. The multimode optical fiber according to claim 1, further comprising a coating formed on outer circumference of the cladding, wherein
    the coating is made of at least one of flame-retardant ultraviolet-curing resin and flame-retardant thermoplastic resin.

4. The multimode optical fiber according to claim 2, further comprising a coating formed on outer circumference of the cladding, wherein
    the coating is made of at least one of flame-retardant ultraviolet-curing resin and flame-retardant thermoplastic resin.

5. An optical fiber ribbon comprising a plurality of multimode optical fibers each including
    a core; and
    a cladding that is formed around the core, wherein a refractive index profile n(r) in a radial direction of each of the optical fibers is approximated by $n(r) = n1[1 - 2(\Delta 1/100)(r/a)^\alpha]^{1/2}$, when $0 < r \leq a$, and $n(r) = n1[1 - 2(\Delta 1/100)]^{1/2}$, when $a < r$, where n1 is refractive index at a center of the core, Δ1 is relative refractive index difference between the center of the core and the cladding, a is radius of the core, α is refractive index profile parameter, and "^" is a symbol representing an exponential, α is 1.95 to 2.15, the relative refractive index difference is equal to or larger than 1.5%, a diameter of the core is 20 micrometers to 45 micrometers, a diameter of the cladding is 70 micrometers to 90 micrometers, a bending loss at a wavelength of 850 nanometers when bending the optical fiber with a curvature radius of 5 millimeters is equal to or lower than 0.1 dB/turn, and the optical fibers are integrated in a flat band shape by being arranged in parallel.

6. The optical fiber ribbon according to claim 5, wherein the optical fibers are integrated by a ribbon coating made of at least one of flame-retardant ultraviolet-curing resin and flame-retardant thermoplastic resin.

7. An optical interconnection system comprising:

a vertical cavity surface emitting laser that outputs an optical signal in a wavelength band of 0.85 micrometers; and an optical fiber ribbon connected to the vertical cavity surface emitting laser, the optical fiber ribbon including a plurality of multimode optical fibers each including a core, and a cladding that is formed around the core, wherein a refractive index profile n(r) in a radial direction of each of the optical fibers is approximated by $n(r) = n1[1 - 2(\Delta 1/100)(r/a)^\alpha]^{1/2}$, when $0 < r \leq a$, and $n(r) = n1[1 - 2(\Delta 1/100)]^{1/2}$, when $a < r$, where n1 is refractive index at a center of the core, Δ1 is relative refractive index difference between the center of the core and the cladding, a is radius of the core, α is refractive index profile parameter, and "^" is a symbol representing an exponential, α is 1.95 to 2.15, the relative refractive index difference is equal to or larger than 1.5%, a diameter of the core is 20 micrometers to 45 micrometers, a diameter of the cladding is 70 micrometers to 90 micrometers, a bending loss at a wavelength of 850 nanometers when bending the optical fiber with a curvature radius of 5 millimeters is equal to or lower than 0.1 dB/turn, and the optical fibers are integrated in a flat band shape by being arranged in parallel.

8. The optical interconnection system according to claim 7, wherein the optical fibers are integrated by a ribbon coating made of at least one of flame-retardant ultraviolet-curing resin and flame-retardant thermoplastic resin.

* * * * *